United States Patent [19]

Inskeep

[11] Patent Number: 4,979,359
[45] Date of Patent: Dec. 25, 1990

[54] DUAL IMPLEMENT HITCH AND RAKE COMBINATION

[76] Inventor: William B. Inskeep, Route 4, Box 15, Culpeper, Va. 22701

[21] Appl. No.: 463,463

[22] Filed: Jan. 11, 1990

[51] Int. Cl.$^5$ .......................... A01D 7/00; A01D 78/04
[52] U.S. Cl. ........................................ 56/14.9; 56/15.5
[58] Field of Search ....................... 56/14.9, 15.1, 15.3, 56/15.5, 15.6, 15.7, 15.9, 228, 376, 377, DIG. 14; 280/411.1, 412, 413, 463, 467

[56] References Cited

U.S. PATENT DOCUMENTS

| | | | |
|---|---|---|---|
| 1,012,220 | 12/1911 | Pearson | 280/412 |
| 2,316,397 | 4/1943 | Briscoe | 280/463 |
| 3,124,371 | 3/1964 | Weir | 280/463 |
| 3,832,837 | 9/1974 | Burkhart et al. | 56/218 |
| 3,990,718 | 11/1976 | Holland | 280/408 |
| 4,081,946 | 4/1978 | Ehrhart | 56/14.4 |
| 4,196,917 | 4/1980 | Oakes et al. | 280/463 |
| 4,418,516 | 12/1983 | Donovan et al. | 56/228 |
| 4,478,032 | 10/1984 | Inskeep | 56/377 |
| 4,685,282 | 8/1987 | Allen | 56/14.9 X |
| 4,912,916 | 4/1990 | Parsons, Jr. | 56/15.5 X |
| 4,916,889 | 4/1990 | Molstad | 56/14.9 |

Primary Examiner—Thuy M. Bui
Attorney, Agent, or Firm—Munson H. Lane, Jr.

[57] ABSTRACT

A dual implement hitch for pivotal connection to the drawbar of a towing vehicle whereby a pair of implements, such as rakes, tedders and the like may be selectively towed in different relative positions without disconnecting the implements from the hitch and reconnecting same in different positions. The hitch comprises an arched longitudinal frame having a clevis at its front end for connection to a towing vehicle and a transverse frame, supported by wheels at its opposite ends, pivoted to the rear end of the longitudinal frame to swing about a vertical axes. A power actuator is connected between the arched longitudinal frame and the transverse frame for changing the angular position of the transverse frame relative to the longitudinal frame. A first drawbar, fixed to the front end of the hitch, extends rearwardly for towing as implement under the longitudinal frame, and a second drawbar, fixed to the transverse frame, rearwardly thereof for towing an implement to the rear of the hitch. Changing the angular position of the transverse frame member, relative to the longitudinal frame member causes the rear end of the hitch to shift to the right or left depending upon the direction of angular change produced by the power actuator.

11 Claims, 3 Drawing Sheets

DUAL IMPLEMENT HITCH AND RAKE COMBINATION

BACKGROUND OF THE INVENTION

1. Field of the Invention

The invention relates to an improved hitch for selectively towing a pair of wheel supported implements, such as hay rakes tedders and the like, behind a towing vehicle in different relative positions of the pair of implements with respect to each other and with respect to the towing vehicle by operation of a power actuator which causes a shift in the relative positions without requiring that the implements be disconnected, repositioned and reconnected to the hitch.

2. Background of the Invention

The invention is an improvement upon the dual implement hitch disclosed in my prior U.S. Pat. No. 4,478,032, issued October 23, 1984.

The improved dual implement hitch of the present invention will perform the same functions described in my prior U.S. Pat. No. 4,478,032, however, because of the changes which have been made, the present hitch is more economical to manufacture. Futhermore, the present hitch is power actuated so that an operator in the towing vehicle can cause a shift of the relative positions of the implements without leaving the towing vehicle.

The improved hitch of this invention, like my prior hitch, includes an arched longitudinal frame member having hitch means at its front end for pivotal connection to the drawbar of a tractor, or other towing vehicle, and a transverse frame member having ground support wheels at its opposite ends connected to the rear end of the elongated frame member. The arched longitudinal frame member permits a first implement to be pivotally connected to and towed under the longitudinal frame member by a short drawbar extending rearwardly from the front end of the hitch.

My improved hitch differs from my prior hitch disclosed in U.S. Pat. No. 4,478,032 in that the transverse frame member is pivotally connected to the rear end of the longitudinal frame member and its ground support wheels are rotatably mounted on stub axles fixed to opposite ends of the transverse frame member.

The hitch disclosed in U.S. Pat. No. 4,478,032, in contrast, has its transverse frame member fixed to the rear end of the longitudinal frame member and its ground support wheels are mounted on opposite ends of the transverse frame member for simulataneous dirigible movement relative to the transverse frame member.

Elimination of the dirigible wheels mounted at opposite ends of the transverse frame member and the required tie rod interconnecting same has in the present hitch reduced the number of costly parts required for the hitch, thereby, reducing the cost of manufacture while pivoting the transverse frame member to the rear end of the longitudinal frame member provides for angular adjustment of the transverse frame member relative to the longitudinal frame member. Changing the angular adjustment of the transverse frame means causes shifting of the rear end of the hitch to the right or left of a longitudinal center line extending through the towing vehicle and the pivotal connection between the hitch and the towing vehicle.

A power actuator connected between the rear end of the longitudinal frame member and the transverse frame member in my improved hitch provides for power adjustment of the angular position of the transverse frame member relative to the longitudinal frame member. The power actuator is preferably, but not limited to, a hydraulic piston and cylinder.

A short tow bar fixed to and extending rearwardly of the transverse frame member from a central position thereon provides means for the connection of the second implement of a pair of implements to the improved hitch.

The two implements, one connected to the front of the hitch under the longitudinal frame member, and the other connected to the rear of the transverse frame member, can be selectively towed in tandem, one directly behind the other in longitudinal alignment for transport along a road, or they may be towed with the rear implement offset laterally to the right or left of the front implement depending upon the angular adjustment of the transverse frame member relative to the longitudinal frame member.

When the implements connected to the hitch are, for example, a pair of similar side delivery rakes which deliver hay to the left, the two rakes will rake up and deliver two separate windrows when the rear rake is offset to the right of the front rake. If the hay in a cut field is light, it may be advantageous to rake up two swarths with the two rakes and to combine the output of the two rakes into one windrow. This can be done by offsetting the rear end of the hitch to the left so that the rear rake picks up the hay delivered by the front rake and combines it with the hay in the swarth over which the rear rake travels.

SUMMARY OF THE INVENTION

A dual implement hitch for towing a pair of wheel supported implements behind a towing vehicle comprising a main longitudinal frame member having an elongated elevated portion, a front post portion depending from one end of the elongated elevated portion, and a downwardly and rearwardly inclined rear portion extending from the other end of the elongated elevated portion, hitch means extending forwardly from the front post portion for pivotally connecting the hitch to a towing vehicle, a transverse frame member of inverted U-shape having an elongated elevated top horizontal portion and depending legs on opposite ends of the elevated top horizontal portion, a stub axle extending outwardly from each of the depending legs, a ground support wheel rotatably mounted on each of the stub axles, means pivotally connecting the rear end portion of the longitudinal frame member on the top horizontal portion of the transverse frame member at substantially the midlength thereof for rotation of the transverse frame member relative to the longitudinal frame member about a vertical axis, power actuator means connected between the longitudinal frame member and the transverse frame member to adjust the angular position of the transverse frame member relative to the longitudinal frame member from an intermediate perpendicular transport position to adjusted angled positions rotated clockwise and counterclockwise from the perpendicular position, a first drawbar means fixed to the front post and extending rearwardly therefrom for pivotally connecting a first implement to the hitch under the elongated elevated portion of the longitudinal frame member, and a second drawbar fixed to and extending rearwardly of the transverse frame member for

BRIEF DESCRIPTION OF THE DRAWINGS

With the foregoing more important objects and features in view and such other objects and features which may become apparent as this specification proceeds, the invention will be understood from the following description taken in conjunction with the accompanying drawings, in which like characters of reference are used to designate like parts, and in which.

DETAILED DESCRIPTION OF THE INVENTION

Figure 1:
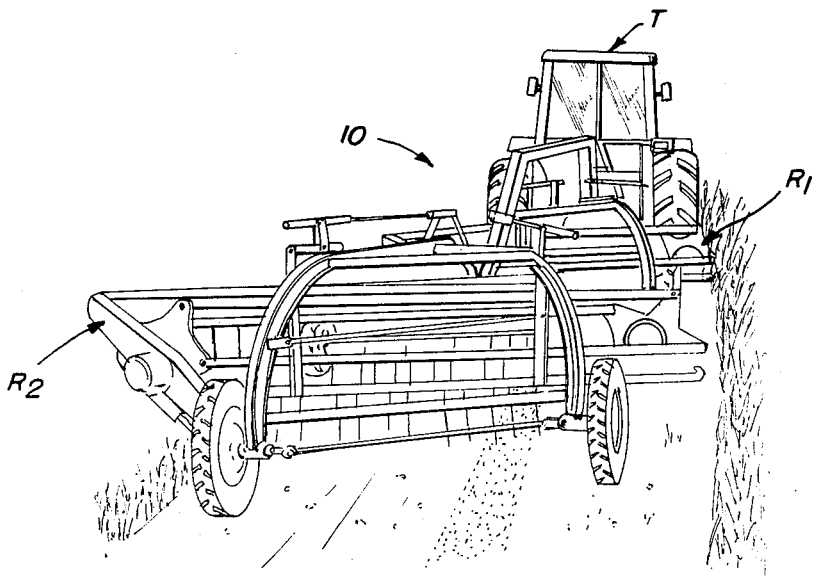
FIG. 1 is a perspective view showing a tractor towing the improved hitch of the invention with a pair of side delivery rakes connected to the hitch in transport position along a road.
Figure 7:
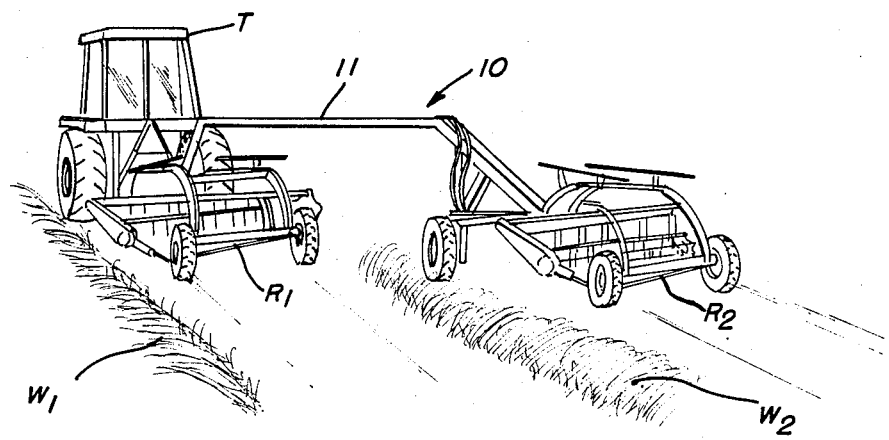
FIG. 7 is a perspective view showing the hitch according to the invention connecting two side delivery rakes in a double windrowing mode.
Figure 8:
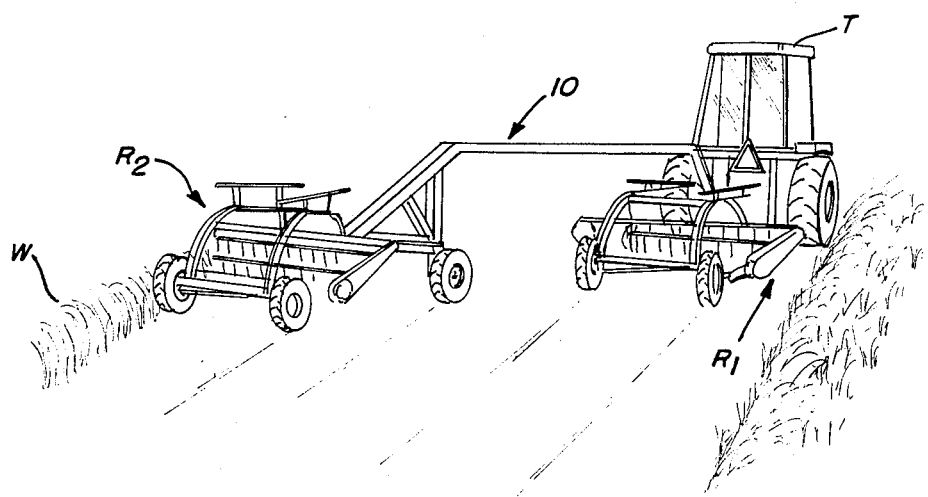
FIG. 8 is a perspective view showing the hitch according to the invention connecting two side delivery rakes in a single windrowing mode.

Referring to the drawings and particularly to FIGS. 1, 7 and 8, the invention, as indicated by the reference numeral 10, is a hitch device for connecting a plurality of wheeled implements with a towing vehicle to be towed in tandem behind the towing vehicle for transportation, or to be towed in either of a right-hand, or a left-hand laterally spaced staggered relationship for field use. The hitch device 10 is especially suited for connecting a pair of rakes $R_1$ and $R_2$, each having its own wheel supported frame, with the towbar of a tractor T as shown in FIGS. 1, 7 and 8. FIG. 1 shows the hitch 10 with rakes $R_1$ and $R_2$ connected in tandem behind the tractor T for transportation, FIG. 7 shows the hitch 10 with rake $R_2$ laterally spaced to the right and to rear of rake $R_1$ and FIG. 8 shows the hitch 10 with rake $R_2$ laterally spaced to the left and to the rear of rake $R_1$.

The hitch 10 as seen in FIGS. 2 through 6 comprises an arched longitudinal main frame member 11, having hitch means 12 at its front end for pivotal connection to the drawbar of a tractor, and a transverse frame member, or rear wheel assembly, 13, to the top center of which the rear end of the longitudinal main frame member 11 is pivotally mounted. The opposite ends of the transverse frame member 13 are each supported above the ground by a wheel 14 with a tire 15. Each wheel 14 is mounted on a stub axle 16.

Figure 2:
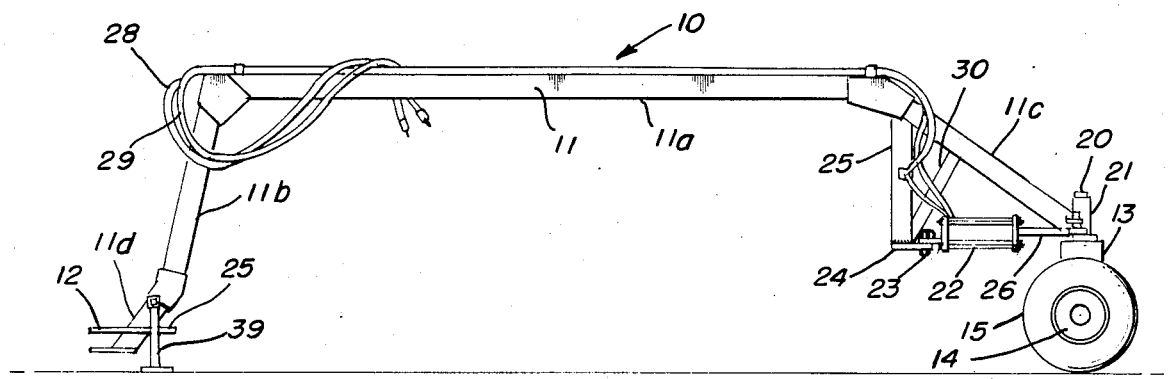
FIG. 2 is a side elevational view of the improved hitch of the invention.
Figure 3:
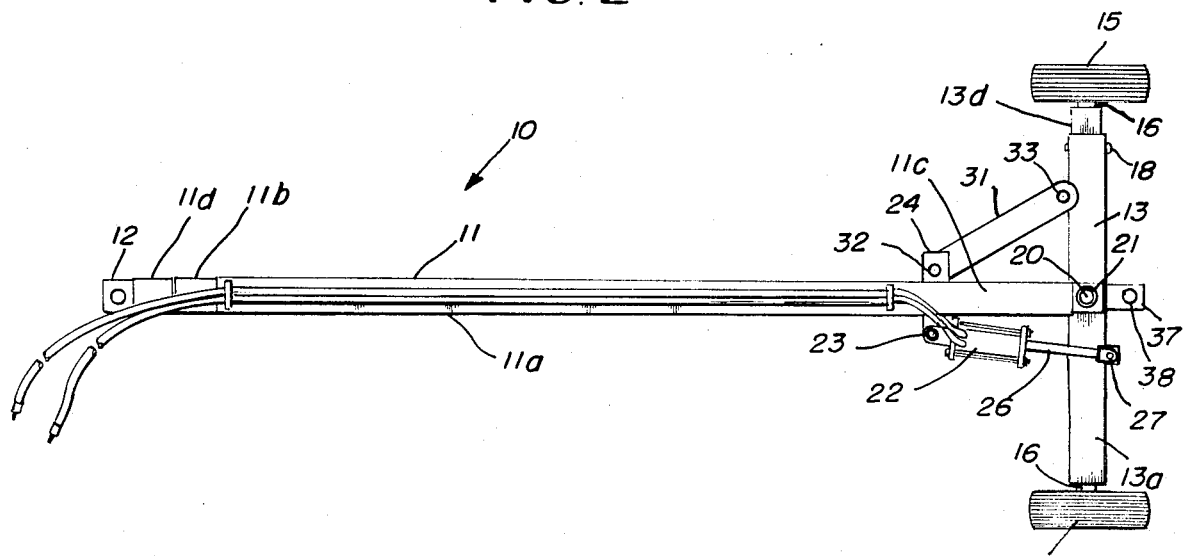
FIG. 3 is a top plan view of the invention shown in FIG. 2.

The main longitudinal frame member 11 includes a generally horizontal top central portion 11a, a depending steeply inclined front post portion 11b and a downwardly less steeply inclined rear portion 11c. The portions 11b and 11c are rigidly joined to the opposite ends of the top central portion 11a. The front post portion 11b is provided at its lower end with a rigidly connected more forwardly inclined portion 11d to which the hitch means 12 is rigidly attached in a forwardly extended relationship. A short drawbar 25 is rigidly connected to the rear side of the front post portion 11d behind the hitch means 12 for pivotally connecting an implement thereto beneath the top central portion 11a. The top central portion 11a is elevated sufficiently by the front post portion 11b to swing with clearance over an implement connected to the drawbar 25. A jack 39 is shown in FIG. 2 supported from the front post portion 11b for facilitating the connection of the hitch means 12 to a tractor drawbar.

The transverse frame member 13 is of an inverse U-shape comprising a top horizontal portion 13a and depending leg portions 13b and 13c connected to opposite ends of the top horizontal portion 13a. The leg portion 13b is rigidly connected to the left-hand end of the top horizontal portion 13a while the leg 13c is rigidly connected at its upper end to a right angle member 13d which telescopes within the right-hand end of the top horizontal portion 13a to provide for the adjustment of the spacing between the tires 15. The adjustment of length provided by the telescoping members 13a and 13d permits the hitch 10 to accommodate rakes of different widths in order to avoid having the tires 15 run over the windrow of raked hay. Preferably the member 13a is a tube of rectangular cross section while the member 13d is a rectangular bar sized to slide within the open right-hand end of the member 13a. For selective adjustment of the distance between the tires 15 the bar 13d is provided with a plurality of holes 17 spaced along its length so that a bolt 18 may be inserted through aligned holes on opposite sides of the member 13a near its open end and through a selected one of the spaced holes in the bar 13d. The bolt may be retained in the member 13a and the selected hole of member 13d by a pin 19.

Figure 4:
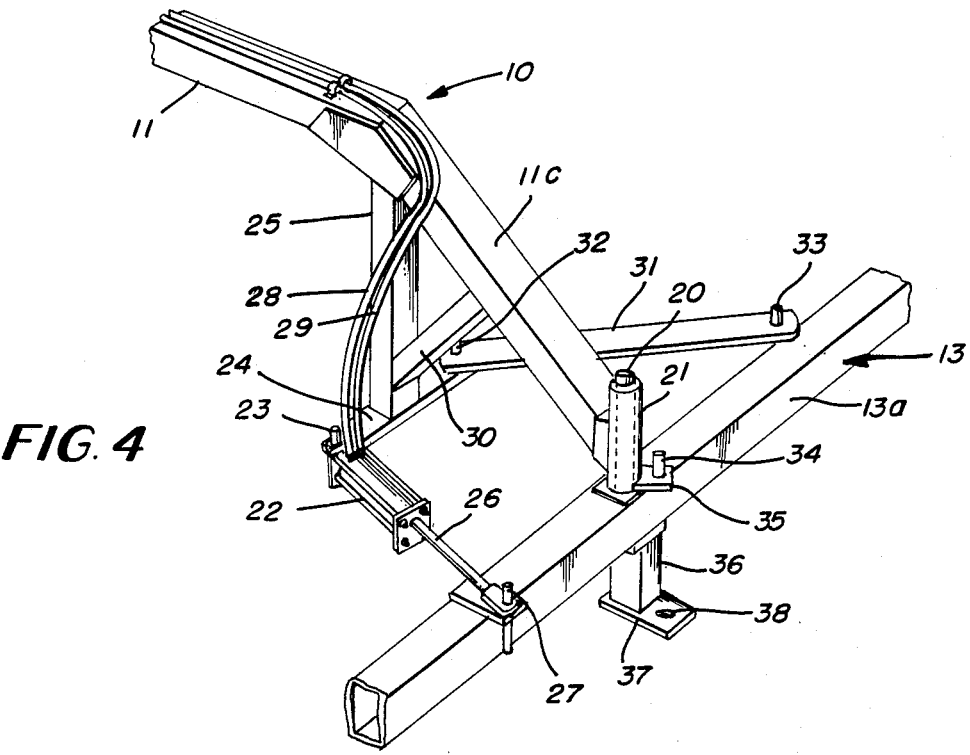
FIG. 4 is an enlarged perspective view of the rear portion of the hitch shown in FIG. 2.
Figure 5:
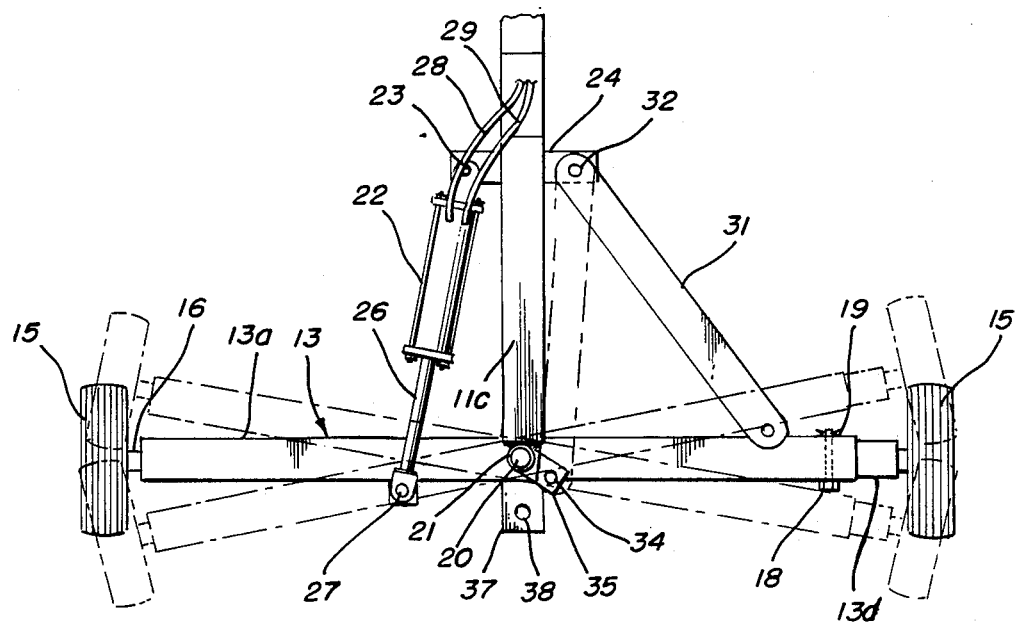
FIG. 5 is a top plan view of the rear portion of the hitch shown in FIG. 3 showing the rear axle of the hitch in different adjusted positions of operation.
Figure 6:
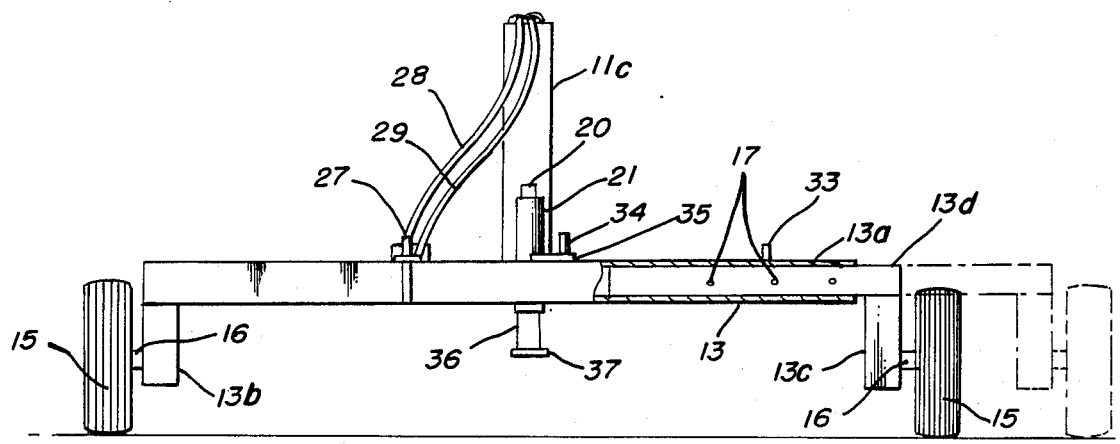
FIG. 6 is a rear elevational view of the rear end portion of the hitch showing in partial cross section the telescoping right-hand end of the transverse frame member in extreme adjusted positions.

Referring now to FIG. 4 which shows an enlarged view of the rear end of the hitch 10, a vertical bearing pin 20 is shown fixed to and extending upwardly from the center of the transverse frame member 13 and a sleeve 21, rigidly attached to the rear end portion 11c of the longitudinal frame member 11, is shown rotatably mounted over the bearing pin 20. The pin and sleeve connection between the transverse frame member 13 and the longitudinal frame member 11 permit angular adjustment between the two members.

A power actuator 22 comprising a reciprocating hydraulic piston and cylinder motor has one end pivotally connected at 23 to a transversely extending bar 24 which is welded to the bottom of a vertical post 25 fixed to and depending from the underside of the rear end portion 11c of the longitudinal frame member 11. A piston rod 26 extends outwardly from the other end of the piston and cylinder 22 and is pivotally connected to a vertically extending pivot pin 27 which is fixed to and extends upwardly above the top of the transverse frame member 13. The pivot pin 27 is spaced outwardly from the bearing pin 20 a greater distance than the distance between the pivot 23 and the vertical axis of post 25. Hydraulic lines 28 and 29 extend from the front of the hitch 11, where they are adapted to be connected to a hydraulic power supply and control device (not shown) on the tractor T, to the hydraulic actuator 22. Extension of the piston rod 26 causes the transverse frame member to swing counter clockwise about the axis of the sleeve 21 and retraction of the piston rod 26 causes the transverse frame member to swing clockwise about the axis of the sleeve 21 as viewed in FIG. 5.

A brace 30 is provided between the lower end portion of the post 25 and the rear end portion 11c to add rigidity to the post 25. A transport bar 31 of fixed length is pivotally connected to the bar 24 to swing about pivot 32 located on the opposite side of the post 25 from the pivot 23. The other end of the transport bar may either be connected to the pin 33 which is fixed to and extends upwardly from the transverse frame member 13, or it may be connected over the pin 34 which is located parallel to the sleeve 21 and extends upwardly from a small plate 35 which is welded to the sleeve 21 and extends rearwardly and to the right of the sleeve. When connected to the pin 33, attached to the transverse frame member 13, the transport bar 31 holds the transverse frame member in perpendicular adjustment relative to the longitudinal frame member 11. When the transport bar is connected to the pin 34 (attached to sleeve 21 by the plate 35) the transport bar is secured in a nonfunctional position, therefore, the transverse frame member 13 is free for angular adjustment, relative to the longitudinal frame member, by the actuator 22.

A short vertical post 36 is fixed to the underside of the transverse frame member 13 substantially in axial alignment with the vertical pivot pin 20. A short drawbar 37, fixed to the bottom of the post 36 as by welding, extends rearwardly from the post 36. A hole 38 through the drawbar 37 provides means for connecting the drawbar of a rake or other implement to the rear end of the hitch 10 using a clevis and pin connector or other pivotal connection means. The drawbar 37, being fixed to the post 36 which in turn is fixed to the transverse frame member 13a swings with the transverse frame member when the transverse frame member is angularly adjusted relative to the longitudinal frame member 11.

The relatively wide spacing between the wheels 14 on opposite ends of the transverse frame member 13 is important first, because the wide spacing provides stability to the hitch 10 to prevent overturning thereof when the rear end of the hitch is swung wide to the right or left of a longitudinal center line through the towing vehicle, and second, because the wide spacing permits the rear end of the hitch to straddle a windrow or swarth of hay which is being picked up and delivered to one side by a side delivery rake connected to the drawbar 37. For most rakes with which the hitch will be used, a satisfactory spacing between the outsides of the tires 15 has been found to be in the range of between seven and eight feet. The use of a single wheel, or a pair of closely spaced wheels at the rear of the hitch has been found to be unsatisfactory because when the rear end of the hitch is swung out wide, the hitch tends to overturn.

Another important feature of the present hitch is the elevation of the horizontal portion 13a of the transverse frame member so that it will clear a windrow of hay over which it passes. A satisfactory height, given as a nonlimiting example, between the bottom of the horizontal portion 13a and ground has been found to be approximately 23 inches.

Still another important feature of the invention is the pivotal mounting of the rear end of the longitudinal frame member 11 on the transverse frame member 13 at the approximate midlength of the transverse frame member so that the transverse frame member may be swung about a vertical pivot clockwise and counter clockwise relative to the pivot axis and adjusted in a selected angular relationship relative to the longitudinal frame member 11. Being able to swing the rear end of the hitch 10 to the right and to the left of a longitudinal centerline through the towing vehicle enables the towing of a pair of side delivery rakes which rake to the same side (whether to the left, as is most common, or to the right) in either the mode of raking and delivering separate windrows or in the mode of combining windrows.

The hitch 10 can also be used to pull a pair of rakes which deliver to different sides, that is, one rake will deliver to the right and the other will deliver to the left.

While the invention has been described particularly for use in towing a pair of rakes, it can also be used for towing other light draft implements, such as tedders and windrow inverters. It is generally unsatisfactory for towing heavy draft implements, such as plows, disks and the like because the resistance caused by the plow or disk engaging the ground will tend to pull the rear end of the hitch away from its adjusted position.

Another important feature of the invention is the selection of the length of the longitudinal frame member 11a between the front and rear portions 11b and 11c so that in swinging to the right and to the left about the pivot axis of the front hitch 12 with the towing vehicle, the hitch will swing over top of an implement being towed under the longitudinal frame member without interference.

The height of the straight substantially horizontal central portion 11a of the longitudinal frame member above the ground must also be selected with the purpose of providing clearance between the longitudinal frame member and the different implements for which the hitch will be used when an implement is attached to the drawbar 25 and the hitch is connected to a towing vehicle. By way of example, and not for limitation, a satisfactory length for the straight central portion 11a has been found to be approximately 12 feet and a satisfactory height for the central portion 11a when the hitch is connected to a towing vehicle measured from ground to the underside of the central portion 11a is approximately 63 inches.

The lower end 11d of the front post portion 11b is angled forward so that when the front hitch means 12 is connected to a towing vehicle, which in most instances will be a tractor normally carrying a three point hitch, the three point hitch extending rearwardly from the tractor will not hit the front post 11b when turning.

The frame elements 11 and 13 are preferably made of tubular metal stock having sufficient strength and rigidity to avoid bending and breaking when under load.

The mounting of the hydraulic actuator 22 to extend in a generally fore and aft direction to one side of the longitudinal frame member has been done to afford visibility of the actuator to the operator on the towing vehicle and to provide the required thrust to the transverse frame member for turning same in either clockwise or counterclockwise direction about the axis of the pivot sleeve or bushing 21. The vertical post 25 and transverse bar 24 at the bottom of the post are provided in order to provide the proper mounting for the power actuator.

The transport bar 31 is a safety feature which is provided to positively hold the transverse frame member 13 perpendicular to the longitudinal frame member 11 when the hitch and towed implements are being towed along a road or highway. The transport bar 31 requires that the operator physically connect it to the pin 33 on the transverse frame member 13 for transport. When the hitch is being prepared for normal field use, the transport bar 31 will be disconnected by the operator from the pin 33 and connected over the pin 34 for nonfunctional storage as shown by the dotted line position of the transport bar 31 in FIG. 5.

The term "arched" as used herein in describing the longitudinal frame member 11, is intended to describe the elevated position of the central portion 11a relative to the depending front and rear portions 11b and 11c and does not imply that the central portion 11a is curved or arcuate in shape, although such curved or arcuate shape is not excluded.

It is further important that the rear drawbar 37 be short so that the distance between the center of the pivot pin 20 and the center of the hole 38, where the rear implement connects to the drawbar 37 is short. For example, but not by way of limitation, a distance of about four inches between the center of the pivot 20 and the center of the hole 38 has been found to be satisfactory. The short drawbar 37 is necessary in order to avoid having the rear wheel of the hitch strike the implement when turning.

Further with respect to the spacing between the outside of the tires 15, the spacing should be approximately one foot for every one and one-half feet by which the midpoint between the wheels in displaced outwardly (to the right or to the left) from a longitudinal center line through the towing vehicle. The spacing between the tires 15 should, therfore, be chosen on the basis of the maximum outward movement of the rear end of the hitch from the longitudinal center line anticipated.

Normally the pivot point of the connection between the hitch and the towing vehicle will be located on the longitudinal centerline of the towing vehicle in order that in transport along a road the implements will be centered along the aforesaid longitudinal centerline.

The invention has been described in detail for the purpose of illustration, but it will be obvious that numerous modifications and variations may be resorted to within the spirit and scope of the invention as claimed.

What is claimed is:

1. A dual implement hitch for towing a pair of wheel supported implements behind a towing vehicle comprising
    a main longitudinal frame member having an elongated elevated portion, a front post portion depending from one end of the elongated elevated portion, and a downwardly and rearwardly inclined rear portion extending from the other end of the elongated elevated portion,
    hitch means extending forwardly from the front post portion for pivotally connecting the hitch to a towing vehicle,
    a transverse frame member of inverted U-shape having an elongated elevated top horizontal portion and depending legs on opposite ends of said elevated top horizontal portion,
    a stub axle extending outwardly from each of said depending legs, a ground support wheel rotatably mounted on each of said stub axles,
    means pivotally connecting the rear end portion of said longitudinal frame member on the top horizontal portion of said transverse frame member at substantially the mid-length thereof for rotation of said transverse frame member relative to said longitudinal frame member about a vertical axis,
    power actuator means connected between said longitudinal frame member and said transverse frame member to adjust the angular position of said transverse frame member relative to said longitudinal frame member from an intermediate perpendicular transport position to adjusted angled positions rotated clockwise and counterclockwise from said perpendicular position,
    a first drawbar means fixed to said front post and extending rearwardly therefrom for pivotally connecting a first implement to said hitch under said elongated elevated portion of said longitudinal frame member, and
    a second drawbar fixed to and extending rearwardly of said transverse frame member for pivotally connecting a second implement behind said hitch.

2. The dual implement hitch of claim 1 wherein said means for pivotally connecting the rear portion of said longitudinal frame member on the top horizontal portion of said transverse frame member comprises a main vertical pivot pin fixed to and extending upwardly from said top horizontal portion of said transverse frame and a vertical bearing sleeve fixed to the rear end of said longitudinal frame member and rotatably engaged on said vertical pivot pin.

3. The dual implement hitch of claim 1 wherein a vertical post depends from under the longitudinal frame member short of the rear end thereof, said vertical post having a short transverse bar fixed to the bottom end thereof with end portions extending on opposite sides of said vertical post, said vertical post being of a length so that the top of the transverse bar is at approximately the same level as the top of said top horizontal portion of said transverse frame member,
    a vertical connecting pin extending upwardly from the top horizontal portion of said transverse frame member and spaced outwardly from one side of said main vertical pivot pin,
    one end portion of said transverse bar extending from beneath said vertical post on the same side of the longitudinal frame member as said vertical connecting pin,
    said power actuator comprising a fluid piston and cylinder motor having a cylinder, a piston reciprocable within said cylinder and a piston rod extending outwardly from one end of said cylinder, the other end of said cylinder being closed, means for pivotally connecting the other end of said cylinder to either of said one end portion of said transverse bar or to said vertical connecting pin, and means for pivotally connecting said piston rod to either of said one end portion of said transverse bar or to said vertical connection pin which is free of connection to said other end of said cylinder, and fluid conduit means connected to said cylinder for supplying actuating fluid to said cylinder for causing movement of said piston and piston rod.

4. The dual implement hitch of claim 3 together with safety means for locking said transverse frame member in said perpendicular transport position relative to said longitudinal frame member.

5. The dual implement hitch of claim 4 wherein said safety means comprises a transport bar having a fixed length and opposite ends, means for connecting one end of said transport bar to the end portion of said transverse bar extending outwardly from the side of said vertical post opposite to the side of said vertical post on which said cylinder or piston rod is connected,
    a second vertical connecting pivot pin extending upwardly from said top horizontal portion of said transverse frame member and spaced outwardly from said main vertical pivot pin on the side thereof opposite the side where said first named vertical connecting pivot pin is located, and means for separably pivotally connecting the other end of said transport bar to said second vertical connecting pivot pin.

6. The dual implement hitch of claim 5 together with means connected to said longitudinal frame member for holding said transport bar in non-locking position when said other end of said transport bar is separated from said second vertical connecting pin.

7. The dual implement hitch of claim 6 wherein said means for holding said transport bar is non-locking position comprises a third vertical connecting pivot pin and means rigidly connecting said third vertical connecting pivot pin to said vertical sleeve bearing on said longitudinal frame member in outwardly spaced parallel relationship thereto, said means for separably connecting the other end of said transport bar to said second vertical connecting pivot pin, also providing means for separably connecting said other end of said transport bar to said third vertical connecting pivot pin.

8. The dual implement hitch of claim 1 together with safety means for locking said transverse frame member in said perpendicular transport position relative to said longitudinal frame member.

9. The dual implement hitch of claim 1 wherein said front post portion of said main longitudinal frame member has a lower end portion which is downwardly and forwardly inclined relative to the remainder of said front post portion, said hitch means for connecting said hitch to a towing vehicle being located on and extending forwardly from said lower end portion.

10. The dual implement hitch of claim 1 in combination with a pair of side delivery rakes, one side delivery rake being connected to said first drawbar means and the other rake being connected to said second drawbar means.

11. The combination of claim 10 wherein said pair of rakes deliver hay to the same side.

* * * * *